(12) United States Patent
Wittern et al.

(10) Patent No.: US 11,256,693 B2
(45) Date of Patent: Feb. 22, 2022

(54) GRAPHQL MANAGEMENT LAYER

(71) Applicant: International Business Machines Corporation, Armonk, NY (US)

(72) Inventors: John E. Wittern, New York, NY (US); Jim A. Laredo, Katonah, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 176 days.

(21) Appl. No.: 16/137,918

(22) Filed: Sep. 21, 2018

(65) Prior Publication Data
US 2020/0097559 A1 Mar. 26, 2020

(51) Int. Cl.
G06F 16/00 (2019.01)
G06F 16/2453 (2019.01)
G06F 16/2455 (2019.01)
G06F 9/54 (2006.01)

(52) U.S. Cl.
CPC .. G06F 16/24537 (2019.01); G06F 16/24565 (2019.01); *G06F 9/547* (2013.01)

(58) Field of Classification Search
CPC .......... G06F 16/24565; G06F 16/9024; G06F 16/951; G06F 9/547; G06F 16/957; G06F 16/958
USPC ....................................................... 707/774
See application file for complete search history.

(56) References Cited

U.S. PATENT DOCUMENTS 5,301,317 A * 4/1994 Lohman ............ G06F 16/24547
707/999.002
8,423,534 B2 * 4/2013 Burger .............. G06F 16/24524
707/718
9,804,886 B1 * 10/2017 Wells ...................... H04L 67/02
9,940,472 B2 4/2018 Akkiraju et al.
10,296,524 B1 * 5/2019 Tung ........................ G06N 7/005
(Continued)

FOREIGN PATENT DOCUMENTS

CN 107817996 A 3/2018

OTHER PUBLICATIONS

Elshawi et al., "Declarative Stack for Distributed Graph Processing," Journal of Theoretical and Applied Information Technology, v.96, n.4, Feb. 28, 2018, pp. 1083-1090.
(Continued)

*Primary Examiner* — Vincent F Boccio
(74) *Attorney, Agent, or Firm* — Cantor Colburn LLP; Abdy Raissinia

(57) ABSTRACT

Aspects of the invention include assessing, by a management layer executing on a first processor, a query from a client application requesting data from a server. The assessing occurs prior to the query being executed by a provider. The assessing includes extracting, by the management layer, characteristics of the query. The management layer compares the extracted query characteristics with a policy defined by the provider. Based at least in part on results of the comparing, it is determined by the management layer whether the query is permitted to be executed by the provider at the server. The management layer initiates execution of the query at the server in response to determining that the query is permitted to be executed. The management layer prevents execution of the query at the server in response to determining that the query is not permitted to be executed.

20 Claims, 14 Drawing Sheets

(56) References Cited

U.S. PATENT DOCUMENTS

| 10,387,578 | B1* | 8/2019 | Xiao | G06F 16/24553 |
| 10,558,671 | B2* | 2/2020 | Tamjidi | G06F 16/28 |
| 2003/0191620 | A1* | 10/2003 | Williams | G06F 30/33 |
| | | | | 703/17 |
| 2005/0192937 | A1* | 9/2005 | Barsness | G06F 16/24542 |
| | | | | 707/999.003 |
| 2011/0320431 | A1 | 12/2011 | Jackson et al. | |
| 2013/0339975 | A1* | 12/2013 | Busaba | G06F 9/50 |
| | | | | 718/104 |
| 2018/0210966 | A1* | 7/2018 | Bedi | G06F 16/90335 |
| 2019/0065500 | A1* | 2/2019 | Martin | G06F 16/24552 |
| 2019/0340287 | A1* | 11/2019 | Tamjidi | G06F 9/547 |

OTHER PUBLICATIONS

Ghanbari, Hamoun, "A Hybrid Query Engine for the Structural Analysis of Java and AspectJ Programs," Thesis, Concordia University, Montreal, Quebec, Canada, Sep. 2008, 143 pages.

Johnson, Andrew Artuhur, "Precise Scalable Static Analysis for Application-Specific Security Guarantees," Dissertation, Harvard University, 2015, 154 pages.

\* cited by examiner

```
function getCharsRecursive
Input:
    schema          # schema of the managed GraphQL interface
    chars           # initial or intermediate characteristics
    queryNode       # initially the root of the query
    currentNesting  # nesting level at the current position of the query
    currentFactor   # factor for complexity calculation & counts
Output: chars       # final characteristics
for each child of queryNode do:
    objectType = getObjectTypeofNode(queryNode, schema) # type information, incl. children
    configuration = getObjectTypeConfiguration(objectType) # user-provided configuration if currentNesting > chars.maxNesting do:
        chars.maxNesting = currentNesting
    end if chars.typeCounts[objectType] =
        chars.typeCounts[objectType] + currentFactor chars.resolveComplexity =
        chars.resolveComplexity + currentFactor * configuration.resolveWeight nextFactor = currentFactor * queryNode.args[configuration.multiplierArgument]

chars.typeComplexity =
        chars.typeComplexity + nextFactor * configuration.typeWeight if queryNode has children do:
        getCharsRecursive(schema, chars, child, currentNesting + 1, nextFactor)
    end if
end for
return chars
```

FIG. 10

GRAPHQL MANAGEMENT LAYER

BACKGROUND

The present invention generally relates to web application programming interfaces (APIs), and more specifically, to providing a GraphQL management layer.

GraphQL is an emerging query language for implementing web APIs where clients send typed queries describing data requirements to a GraphQL interface. The GraphQL interface resolves received queries by fetching or mutating data as requested. One challenge for GraphQL providers is the management of their GraphQL interfaces to define and enforce rate limits, to prevent malicious queries, and to control access to exposed data. When compared to more traditional web API implementation styles, such as representational state transfer (REST), managing GraphQL interfaces is more complex. For example, in GraphQL, rate-limits depend on query complexity, rather than on the number of queries. In addition, unlike REST, in GraphQL access controls depend on resources that are affected by the queries, which typically can only be determined during query execution. Further, the complexity of queries in GraphQL varies and can also typically only be calculated during query execution.

Contemporary approaches to managing GraphQL interfaces typically include starting a query and stopping it mid-execution if the query causes a rate limit to be exceeded or it attempts to access a resource without proper authority.

SUMMARY

According to one or more embodiments of the present invention, computer-implemented methods for managing GraphQL interfaces are provided. A non-limiting example computer-implemented method includes assessing, by a management layer executing on a first processor, a query from a client application requesting data from a server. The assessing occurs prior to the query being executed by a provider. The assessing includes extracting, by the management layer, characteristics of the query. The management layer compares the extracted query characteristics with a policy defined by the provider. Based at least in part on results of the comparing, it is determined by the management layer whether the query is permitted to be executed by the provider at the server. The management layer initiates execution of the query at the server in response to determining that the query is permitted to be executed. The management layer prevents execution of the query at the server in response to determining that the query is not permitted to be executed.

Other embodiments of the present invention implement the features of the above-described methods in computer systems and in computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 10 depicts pseudo code to perform query characteristic extraction according to one or more embodiments of the present invention;

Figure 1:
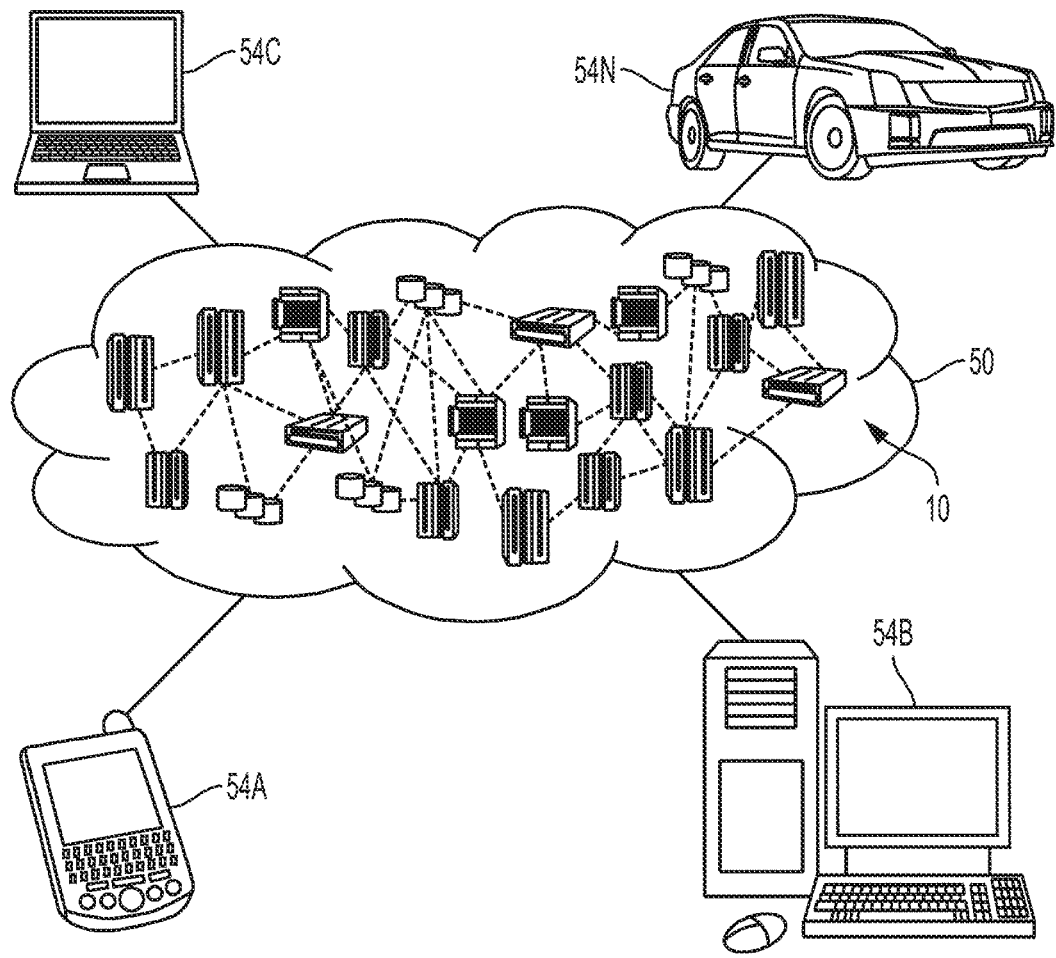
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three-digit reference numbers. With minor exceptions, the leftmost digit(s) of each reference number correspond to the figure in which its element is first illustrated.

DETAILED DESCRIPTION

One or more embodiments of the present invention provide a dedicated GraphQL management layer, which analyzes query complexity and characteristics prior to the query being executed to ensure that the query, when executed, adheres to established provider policies. In one or more embodiments of the present invention, a dedicated server component referred to herein as the "GraphQL management layer" receives GraphQL requests which contain queries. The GraphQL management layer extracts the characteristics of a received query, including assumed complexity and accessed resources, and checks the query for compliance with user-defined policies. If executing the query will result in the policies being adhered to, the GraphQL management layer forwards the query to the managed GraphQL interface. If executing the query will result in the policies not being adhered to, the GraphQL management layer prevents the query from being executed by not forwarding the query to the managed GraphQL interface and may return an error message to the requestor. The GraphQL management layer may also intercept the response data coming back from the GraphQL interface and assesses it to understand what occurred during query execution. The GraphQL management layer uses this information to update rate limit counts.

As used herein, the term "GraphQL server" refers to a server side component of a GraphQL application that fulfills the GraphQL requests with the actual data returned in responses. The GraphQL application may also have a client side component that requests the GraphQL server to initiate one or more queries.

One or more embodiments of the present invention provide technological improvements over current methods of managing GraphQL interfaces that require developers to integrate libraries defining user limits and policies within the GraphQL server for each application, thus tightly coupling the GraphQL server to the libraries. A disadvantage of contemporary approaches is that they induce redundant integration (and thus implementation) efforts every time that they are used which results in processor cycles being used for redundant integrations and implementations. Another disadvantage is that because the libraries defining user limits and polices are integrated into the GraphQL server code, the libraries are programming language specific which limits their reusability. Example embodiments of the present invention provide technical solutions to these disadvantages of existing solutions by providing a dedicated GraphQL management layer that separates the calculating of query implications from the GraphQL server. The GraphQL management layer is programming language agnostic as it can interface with a GraphQL server written in any programming language. In addition, one or more embodiments of GraphQL management layer described herein can be built once and then utilized for any GraphQL client including those written for other GraphQL applications.

One or more embodiments of the present invention provide additional technological improvements over current methods of managing GraphQL interfaces that only consider generic complexity measures and that calculate query complexities while executing the query. A disadvantage of current methods is that they require processor resources to partially execute a query before determining that a complexity threshold has been met, at which point the query execution is halted. Example embodiments of the present invention provide technical solutions to these disadvantages of existing solutions by analyzing query complexity and characteristics before executing the queries to ensure adherence of queries to policies. If it is determined, prior to executing a query, that the query, if executed, will not adhere to the policies then the query will not be sent to the GraphQL server for execution.

It is understood in advance that although this disclosure includes a detailed description of a GraphQL embodiment, implementation of the teachings recited herein are not limited to GraphQL embodiments. Rather, embodiments of the present invention are capable of being implemented in conjunction with any other type of query languages and web application program interfaces (APIs) now known or later developed. Examples include, but are not limited to Falcor by Netflix, Inc. and JavaScript Object Notation (JSON) API.

It is further understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
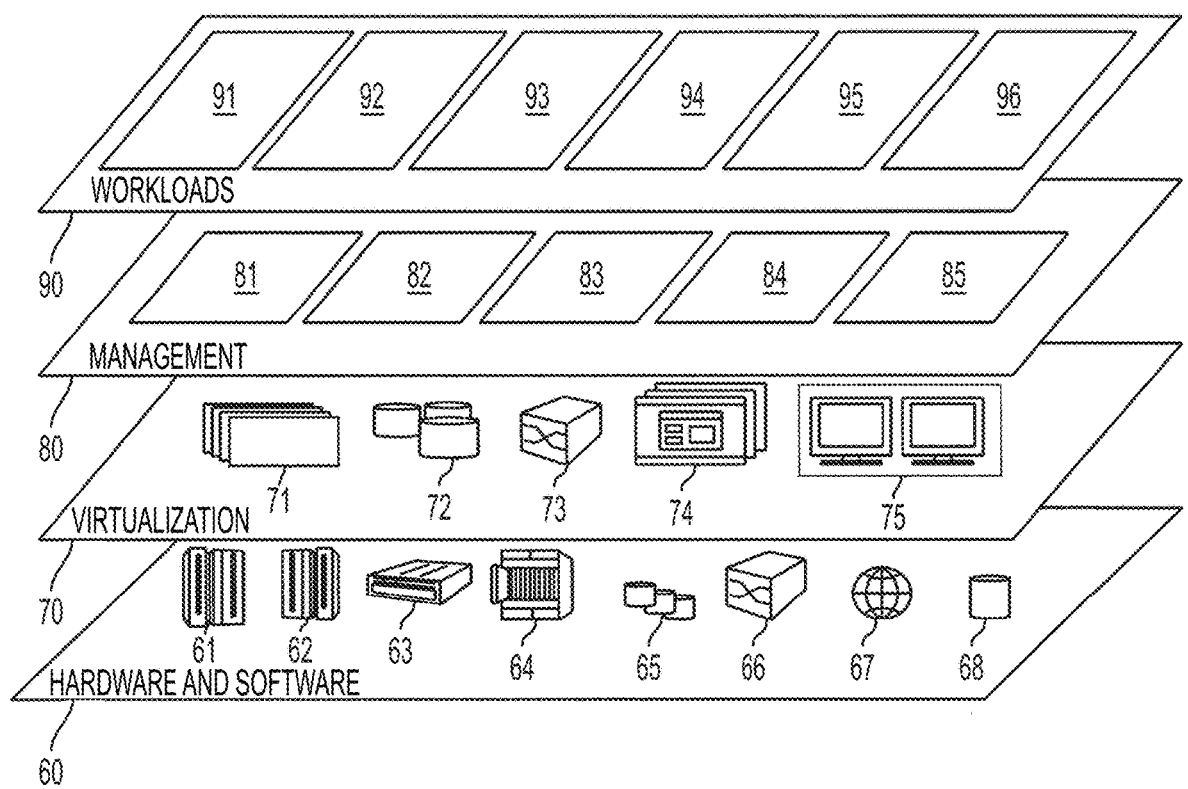
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a GraphQL management layer 96.

Figure 3:
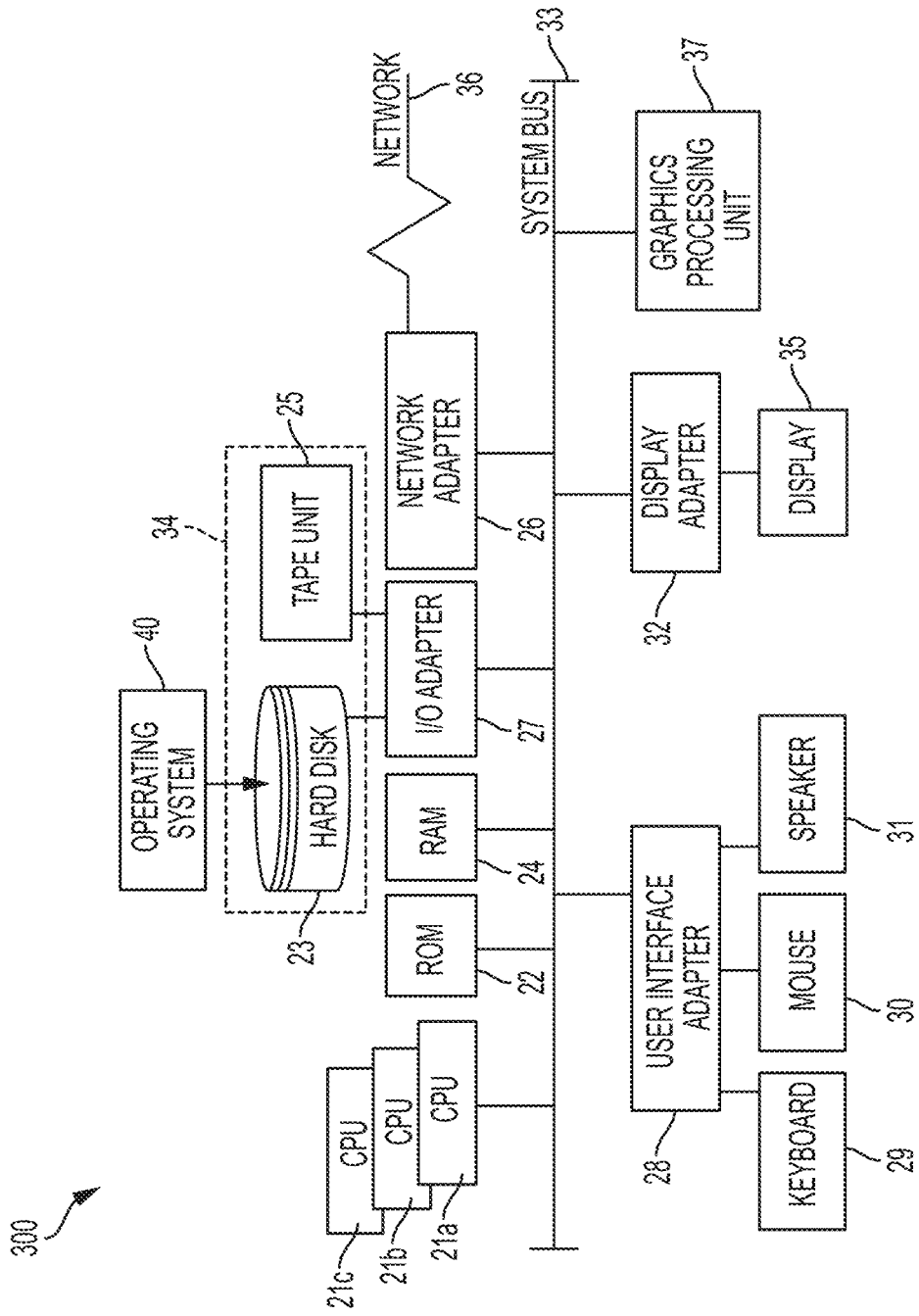
FIG. 3 depicts a processing system for implementing one or more embodiments of the present invention.

It is understood that one or more embodiments of the present invention are capable of being implemented in conjunction with any other type of computing environment now known or later developed. For example, FIG. 3 depicts a block diagram of a processing system 300 for implementing the techniques described herein. The processing system 300 is an example of a computing node 10 of FIG. 1. In the embodiment shown in FIG. 3, processing system 300 has one or more central processing units (processors) 21a, 21b, 21c, etc. (collectively or generically referred to as processor(s) 21 and/or as processing device(s)). According to one or more embodiments of the present invention, each processor 21 can include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and can include a basic input/output system (BIOS), which controls certain basic functions of processing system 300.

Further illustrated are an input/output (I/O) adapter 27 and a communications adapter 26 coupled to system bus 33. I/O adapter 27 can be a small computer system interface (SCSI) adapter that communicates with a hard disk 23 and/or a tape storage drive 25 or any other similar component. I/O adapter 27, hard disk 23, and tape storage drive 25 are collectively referred to herein as mass storage 34. Operating system 40 for execution on processing system 300 can be stored in mass storage 34. The RAM 22, ROM 24, and mass storage 34 are examples of memory 19 of the processing system 300. A network adapter 26 interconnects system bus 33 with an outside network 36 enabling the processing system 300 to communicate with other such systems.

A display (e.g., a display monitor) 35 is connected to system bus 33 by display adaptor 32, which can include a graphics adapter to improve the performance of graphics intensive applications and a video controller. According to one or more embodiments of the present invention, adapters 26, 27, and/or 32 can be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 can be interconnected to system bus 33 via user interface adapter 28, which can include, for example, a Super I/O chip integrating multiple device adapters into a single integrated circuit.

According to one or more embodiments of the present invention, processing system 300 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing, and has a highly parallel structure that makes it more effective than general-purpose CPUs for algorithms where processing of large blocks of data is done in parallel.

Thus, as configured herein, processing system 300 includes processing capability in the form of processors 21, storage capability including system memory (e.g., RAM 24), and mass storage 34, input means such as keyboard 29 and mouse 30, and output capability including speaker 31 and display 35. According to one or more embodiments of the present invention, a portion of system memory (e.g., RAM 24) and mass storage 34 collectively store an operating system such as the AIX® operating system from IBM Corporation to coordinate the functions of the various components shown in processing system 300.

Figure 4:
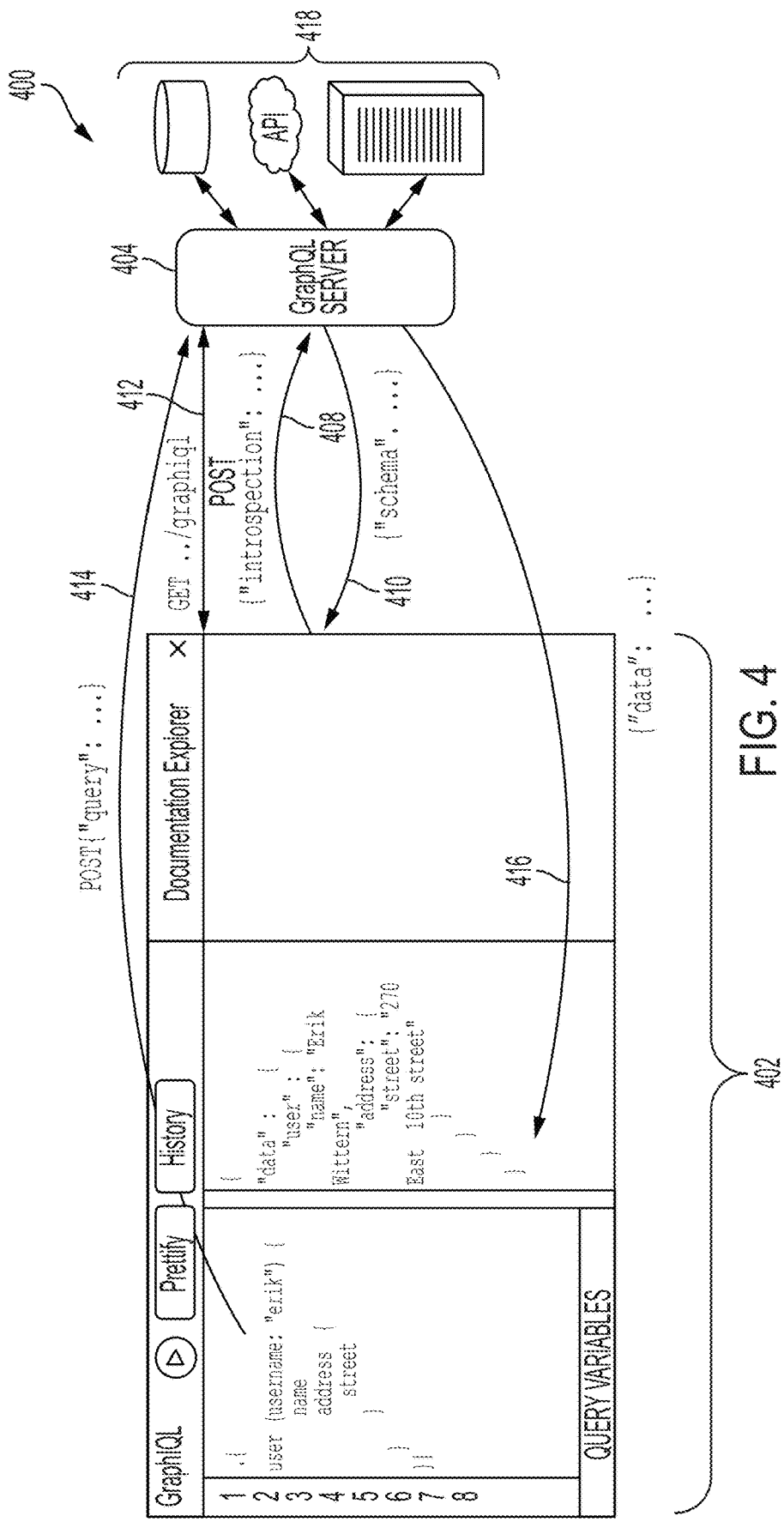
FIG. 4 depicts a high level block diagram of a GraphQL system.

Turning now to a more detailed description of aspects of the present invention, FIG. 4 depicts a high level block diagram of a GraphQL system 400. The GraphQL system 400 shown in FIG. 4 includes a GraphQL client 402, a GraphQL server 404 operated by a provider, and resources 418 accessed by the GraphQL server 404 to service queries. At least a subset of these components of system 400 may be implemented by one or more cloud computing nodes 10 and local computing devices 54A-N of FIG. 1. From a technical point of view, GraphQL encompasses interactions between client and server system components. From an organizational point of view, the server is operated by a provider who makes data and/or other capabilities (e.g., like functions) available via the GraphQL server. The provider defines policies to control how clients can interact with the server, for example to prevent misuse or excessive use.

As shown in FIG. 4, the GraphQL client 402 and the GraphQL server 404 are portions of the same GraphQL application which includes computer instructions for fulfilling a GraphQL request. Arrow 412 shows the GraphQL client 402 receiving a schema for data retrievable via the GraphQL server 404. Arrow 408 shows a request for the schema from the GraphQL client 402 and arrow 410 shows the GraphQL server 404 sending the schema to the GraphQL client 402 in response to the request. The contents of the schema can be used by a programmer, or user, to generate and send a query, as shown by arrow 414 from the GraphQL client 402 to the GraphQL server 404. The query shown in FIG. 4 requests a last name and street address of a user having a username of "erik". In contemporary implementations, the GraphQL server 404 includes computer instructions to perform management functions such as calculating query implications and how close a user is to usage rate limits. If the query executes and it is successful, data is returned to the GraphQL client 402, via the GraphQL server 404 as shown by arrow 416. The data returned as shown in FIG. 4 includes the last name and street address of the user having a username of "erik."

Figure 5:
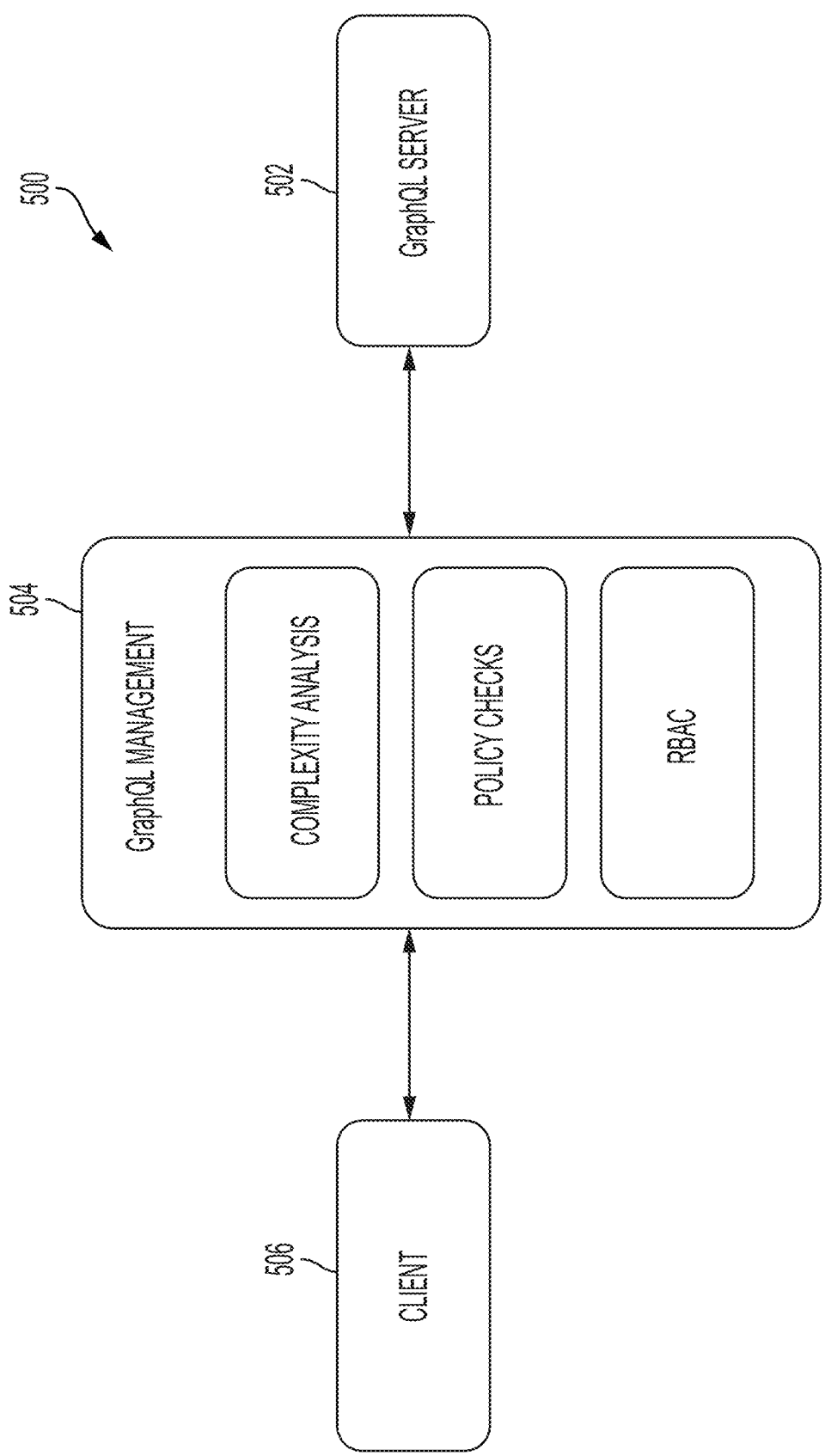
FIG. 5 depicts a block diagram of a GraphQL system that includes a GraphQL management layer according to one or more embodiments of the present invention.

Turning now to FIG. 5, a block diagram of a GraphQL system 500 that includes a GraphQL management layer 504 is generally shown according to one or more embodiments of the present invention. The GraphQL system 500 includes the GraphQL management layer 504 located between a client 506 and a GraphQL server 502. All or a subset of the GraphQL system 500 shown in FIG. 5 may be implemented by one or more cloud computing nodes 10 and local computing devices 54A-N of FIG. 1. In accordance with one or more embodiments of the present invention, the client 506 includes computer instructions to implement a frontend portion of an application that includes generating a query for execution on GraphQL server 502, and the GraphQL server 502 includes backend code configured to perform the query and return the results of the query in a response sent to the client 506.

FIG. 5 depicts a dedicated GraphQL management layer 504 which can statically analyze query complexity and characteristics before query execution in order to ensure adherence to established polices which may be user-defined by a provider. As used herein, the term "statically analyzed" refers to the query being analyzed prior to the query being executed. The GraphQL management layer 504 shown in FIG. 5 includes a complexity analysis module, a policy checks module, and a role-based access control (RBAC) module. Based on the results of assessing, or analyzing, characteristics of the query, the GraphQL management layer 504 can determine whether or not to send the query to the GraphQL server 502. In accordance with one or more embodiments of the present invention, the GraphQL management layer 504 executes on a different physical and/or logical processor than the client 506 or the GraphQL server 502. In accordance with one or more embodiments of the present invention, the GraphQL management layer 504 is architecturally independent of the GraphQL interface implemented by the GraphQL server 502 which services the query.

Figure 6:
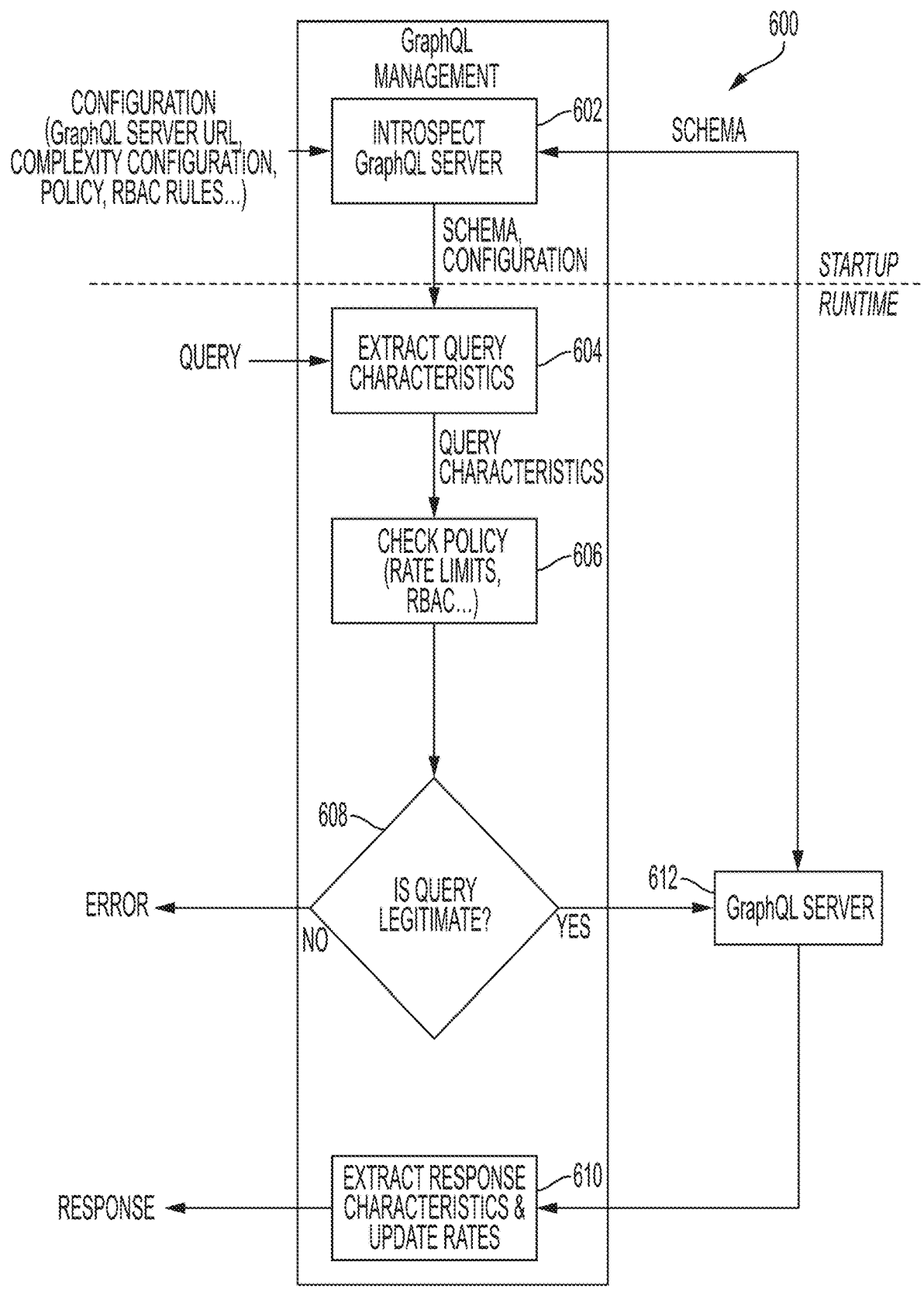
FIG. 6 depicts a flow diagram of a process for managing GraphQL interfaces according to one or more embodiments of the present invention.

Turning now to FIG. 6, a flow diagram 600 of a process for managing GraphQL interfaces is generally shown according to one or more embodiments of the present invention. In accordance with one or more embodiments of the present invention, the processing shown in FIG. 6 is performed by a GraphQL management layer, such as GraphQL management layer 504 of FIG. 5. The GraphQL management layer is implemented by program instructions executable by a processor. Block 602 of FIG. 6 is performed as part of the startup process of a GraphQL application to introspect the GraphQL server that the queries in the GraphQL application will request data from. Input to this block includes the schema (e.g., relationship between objects) and configuration data. The configuration data can include, but is not limited to the Universal Resource Locator (URL) of the GraphQL server, complexity configuration data, and policy data including RBAC rules. An example of complexity configuration data is shown below in FIG. 7 and examples of policy data including RBAC rules are shown below in FIG. 8. A schema and configuration data is output from block 602.

In accordance with one or more embodiments of the present invention, block 602 is performed once during startup and does not have to be performed again unless the schema or configuration files have changed.

Blocks 604 through 610 are performed during runtime of the GraphQL application. At block 604, query characteristics are extracted from a query that is received from a client, such as client 506 of FIG. 5. In accordance with one or more embodiments of the present invention, query characteristics include an estimation of the types and number of data objects that are expected to be retrieved by the query, and configuration data that indicates a cost for retrieving each type object. For a nested query, the characteristics may be extracted using a recursive process that estimates the types and number of data objects expected to be retrieved at each level of the nesting. The values from each level are summed to calculate a total number of objects expected to be retrieved and a cost of retrieving them. In accordance with one or more embodiments, the types of characteristics extracted may vary and are based, at least in part, on contents of a provider policy. For example, if a provider policy has a limit on the number of nesting levels within a query, one of the characteristics extracted from a query may be a number of nesting levels in the query. An example of components used when extracting query characteristics is shown in below in FIG. 9, and an example of pseudo code to perform query characteristic extraction is shown below in FIG. 10.

Query characteristics are output from block 604 and processing continues at block 606 with checking the extracted estimated query characteristics against the established policy. Block 612 is performed and the query is sent to the GraphQL based at least in part on determining at block 608 that executing the query is predicted to conform to the policy. If it is determined at block 608 that executing the query is predicted to not conform to the policy, then the query is prevented from being executing (e.g., not sent to the GraphQL server) and an error message may be generated. At block 610, a response, or results, of the executed query are intercepted and response characteristics are extracted. In addition, rate limits are updated based on the response characteristics. The response is forwarded to the client, either as soon as it is received or after the rate limits are updated depending on performance requirements. An example of components used when extracting response characteristics are shown below in FIG. 11

Figure 7:
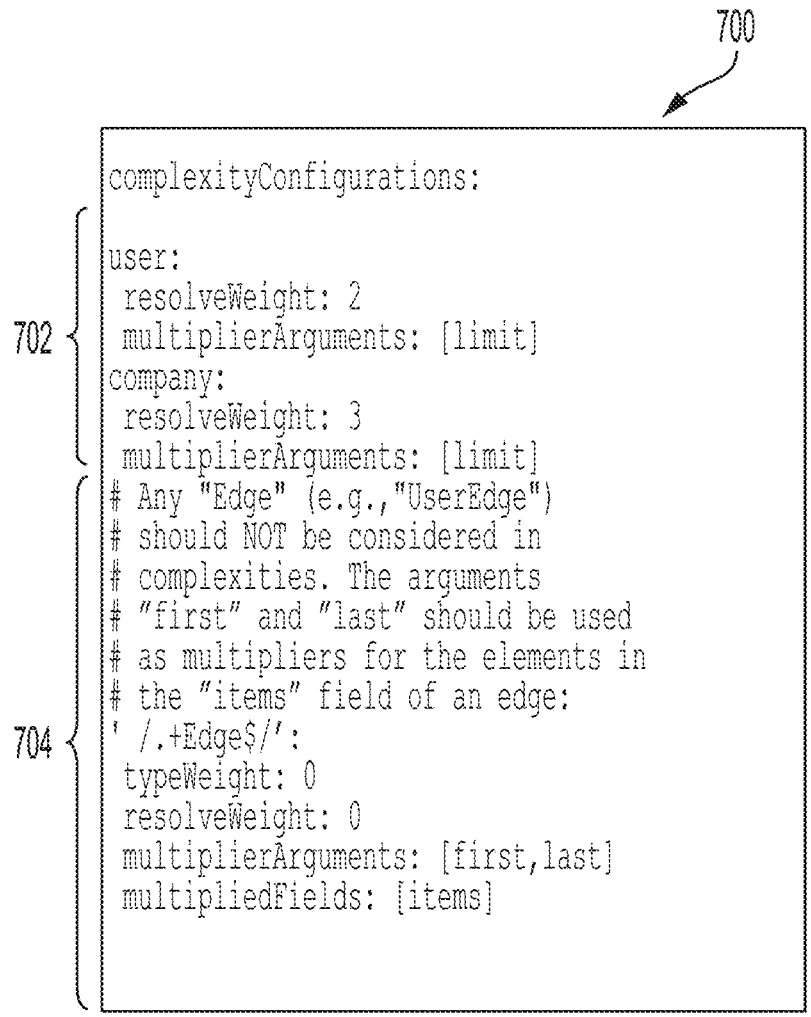
FIG. 7 depicts example GraphQL complexity configuration data according to one or more embodiments of the present invention.

Turning now to FIG. 7, example GraphQL complexity configuration data 700 is generally shown according to one or more embodiments of the present invention. FIG. 7 is provided as one example of complexity configuration data that may be utilized by exemplary embodiments of the present invention. Embodiments of the present invention are not limited to the complexity configuration data shown in FIG. 7, as one skilled in the art will recognize that other types of information and values may also be used to describe complexity aspects of query languages and/or web APIs. The complexity configuration data 700 shown in FIG. 7 includes complexity calculations in a declarative format and is user provided. Section 702 of the complexity configuration data 700 lists target objects and their complexities and may also include other rules. The target objects shown in section 702 include "user" and "company." The target identifies the type of resolve function (and its return type) that the current rule should apply to. Resolve complexity pertains to the number of resolve functions that will be invoked in the GraphQL server. The resolve functions are targeted by a combination of <type>:<field>. The types and fields can be targeted by an exact match (e.g., user), by a regular expressions (e.g., '/.+Connection$/' to target all connections); and by wildcards (e.g., *). The resolveWeight field is used to increase or decrease the impact of resolve functions on resolve complexity. The typeWeight field is used to increase or decrease the impact of object types on object type complexity. The multiplierArguments field includes a list of arguments with numeric values that multiply complexities and counts. The multipliedFields field is used to determine the fields of the targeted type that the multiplierArguments should apply to.

Figure 8:
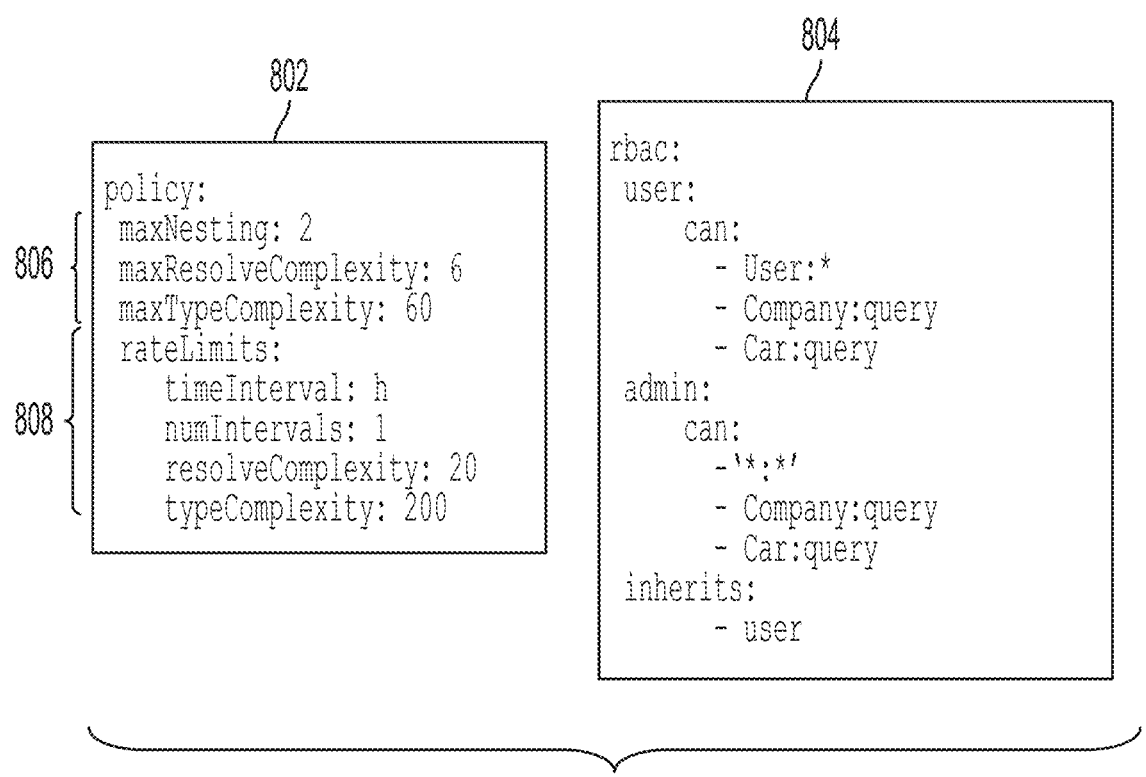
FIG. 8 depicts examples of two types of policies, one related to role-based access control (RBAC) and the other related to rate limits and query complexity.

As shown in section 702 of the complexity configuration data 700, the resolveWeight for the object "user" is two and the multiplierArguments is "limit" indicating that the value of the argument limit in the query will be the factor to multiply by. Also as shown in section 702, the resolveWeight for the object "company" is three and the multiplierArguments is limit. Section 704 of the complexity configuration data 700 includes comments and corresponding configuration data to define actions when edges are encountered Turning now to FIG. 8, two types of policies, policy data 802 which is related to rate limits and query complexity and RBAC permission table 804 which is related to RBAC are generally shown according to one or more embodiments of the present invention. FIG. 8 is provided as one example of policy data and RBAC permissions that may be utilized by exemplary embodiments of the present invention. Embodiments of the present invention are not limited to the policy data and RBAC permission table shown in FIG. 8, as one skilled in the art will recognize that other types of policies and policy data values may also be used in a management layer for query languages and/or web APIs. Section 806 of the policy data 802 describes limits that apply to a given query, and section 808 of the policy data 802 describes limits that apply to a given period of time (e.g., one second, one minute, one hour, eight hours). In accordance with one or more embodiments of the present invention, threat protection, including the blocking of malicious requests is performed by limiting the resources that may be consumed by a single query. In the embodiment shown in section 806 of FIG. 8, both resolve and object type complexity are restricted in a query, along with nesting. As shown in section 806, nesting is limited to two levels, maximumResolve complexity (number of calls multiplied by their complexity) is limited to six, and object type complexity (number of objects returned by the query) is limited to sixty.

An example is presented herein, where a query requests a list of ten users and for each of the ten users the last five companies where they have worked. The example is provided as an aid in describing aspects of embodiments of the present invention and is not intended to be limiting. In the example presented herein, it is estimated that sixty objects (10+50=60) will be retrieved: ten users (10) and five companies for each of the ten users (10×5=50). In this example, the object type complexity is sixty which is equal to the maxTypeComplexity of sixty that is specified in the policy data 802. Thus, the query is not estimated to exceed the object type complexity.

In addition, processing this query will require eleven calls, one (1) to get the list of ten users and then one for each of the ten users (10) to get the last five companies that they have worked for (1+10=11). Applying a resolveWeight of two for the user object and three for the company object as shown in the configuration data 700 of FIG. 7 results in a resolve complexity rating of thirty-two (2+30=32) because the one call to get the list of ten users is multiplied by two (1×2=2) and the ten calls to get the company names are each multiplied by three (10×3=30). In this example, this query would be prevented from executing because the estimated resolve complexity is thirty-two which is greater than the maxResolveComplexity of six in the policy data 802. The level of nesting in this example is two, users and companies that they have worked for.

Referring back to FIG. 8, rate limiting is implemented using section 808 of the policy data 802 which describes limits that apply to all queries from a client (or group of clients) in a given period of time. In the policy data 802 of FIG. 8, the time interval is one hour which is also the total amount of time that the user, or application, has access to the system. Within each hour, the sum of all of the resolve complexities for a client must not exceed twenty and the sum of all of the object type complexities must not exceed two-hundred. Counters are associated with each of these cumulative limits and the counters are updated based on the result characteristics.

In accordance with one or more embodiments of the present invention, RBAC is used to control access to objects based on object types. As shown in the example RBAC permissions table 804 of FIG. 8, a user has access to write or read any objects having an object type that starts with "User" and the user is allowed to read, or request in a query, objects having an object type of "Company" or "Car." Also as shown in the example, RBAC permissions table 804, an administrator has access to write or read any objects as indicated by "*.*" and it inherits the permissions granted to the user (e.g., allowed to read objects having an object type of "Company" or "Car"). Note that additional access control for individual objects may be implemented in the GraphQL server, as such control mechanisms may depend on additional runtime information not available to the static analysis (for example relationships between users and objects).

Invalid requests that include queries that are estimated to violate any of the policies described in the policy data 802 or the permissions table 804 are prevented from executing and may produce errors, as shown for example at block 606 of FIG. 6. Valid requests that comply with the policies are forwarded to the GraphQL server for execution, as shown for example at block 608 of FIG. 6.

Figure 9:
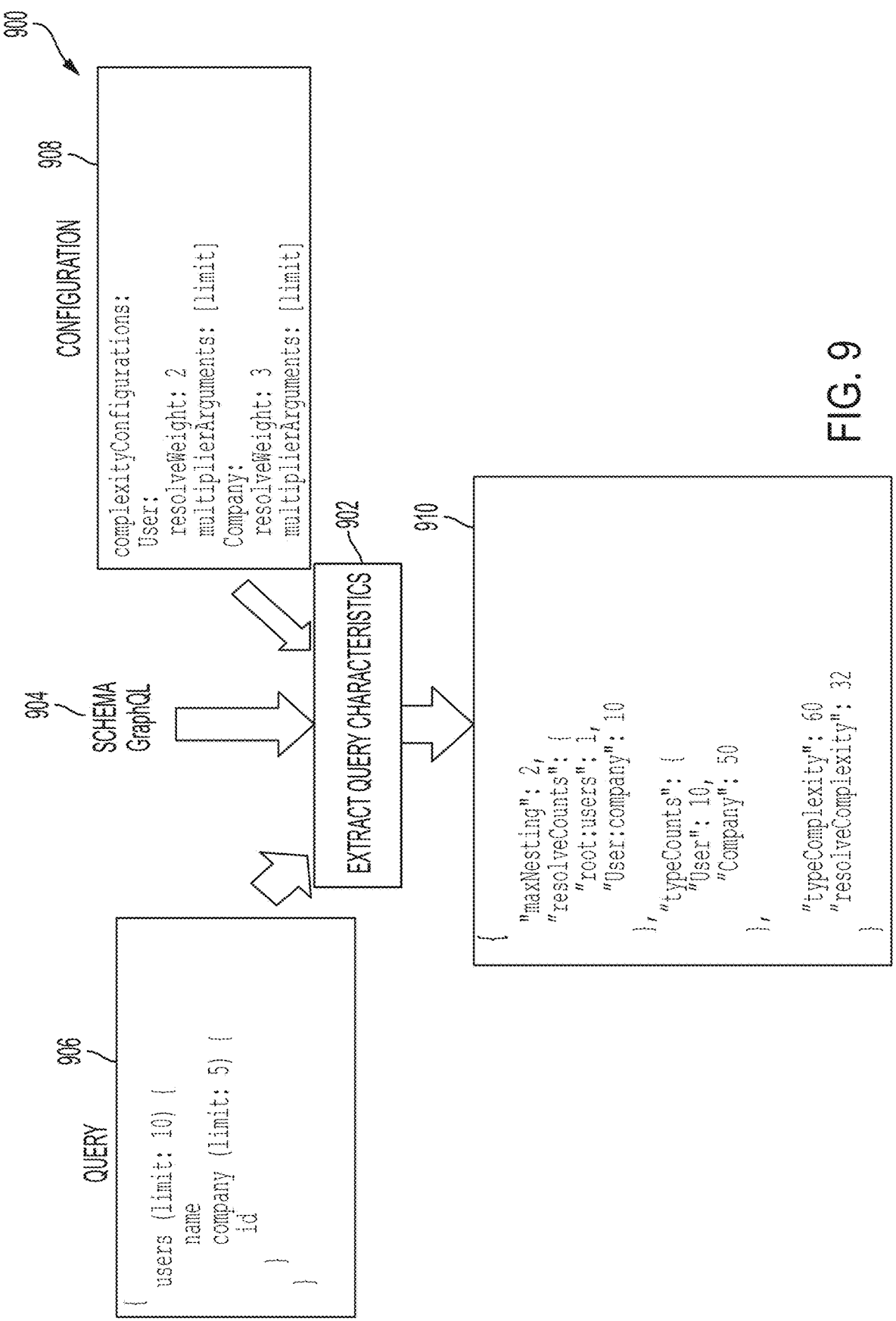
FIG. 9 depicts a block diagram of components for extracting query characteristics before query execution according to one or more embodiments of the present invention.

Turning now to FIG. 9, a block diagram 900 of components for extracting query characteristics using a GraphQL management layer before query execution is generally shown according to one or more embodiments of the present invention. FIG. 9 is provided as one example of inputs that may used (and their values) by a query characteristic extraction process in accordance with one more exemplary embodiments of the present invention. FIG. 9 also provides one example of output, including data characteristics, that may be generated by a query characteristic extraction process in accordance with one more exemplary embodiments of the present invention. Embodiments of the present invention are not limited to the components or data values shown in FIG. 9, as one skilled in the art will recognize that other types of information and data values may also be used as input to and output from a query characteristic extraction process.

The components shown in FIG. 9 include a query 906, a schema 904, configuration data 908, computer instructions to extract query characteristics 902, and the extracted query characteristics 910. All or a subset of the components shown in FIG. 9 may be implemented by one or more cloud computing nodes 10 and local computing devices 54A-N of FIG. 1. In accordance with one or more embodiments of the present invention, the computer instructions to extract query characteristics 902 execute a recursive algorithm that statically assesses arbitrarily nested queries by iterating through them. In each iteration, the algorithm fetches information on the currently visited GraphQL type which is obtained from the schema 904. In addition, in each iteration the query characteristics are updated. This can include determining the maximum nesting level of the query, counts of requested types and resolve functions, and complexity of resolve functions triggered by the query, types of objects addressed, and weights. User provided configurations for complexity calculations are also included in each iteration. In accordance with one or more embodiments of the present invention, a constraint is that the GraphQL fields returning lists enforce a size or condition argument to enable correct static analysis. As an alternative, one or more embodiments of the invention may be configured to rely on a default size or condition argument if none is present.

The query 906 shown in FIG. 9 is the example query described previously and with the same configuration data. The extracted query characteristics 910 are determined as follows. The query requests a list of ten users and for each of the ten users the last five companies where they have worked. At the first level of nesting, ten users are being fetched once with each user having a weight of two. This results in an object type complexity of ten and a resolve complexity rating of two (one fetch to obtain the ten users). At the second level of nesting five companies are being retrieved ten times (one fetch retrieves the five companies for each user) with each company having a weight of two. This results in an object type complexity of fifty and a resolve complexity rating of thirty. The cumulative results for the query is an object type complexity of sixty (10+50) and a resolve complexity rating of thirty-two (2+30). In addition, the level of nesting is two.

Turning now to FIG. 10, pseudo code 1000 to perform query characteristic extraction is generally shown according to one or more embodiments of the present invention. The pseudo code 1000 shown in FIG. 10 extracts objects and their estimated characteristics from a query and it is intended to be just one example of how the query characteristic extraction can be performed. A variety of other approaches and pseudo code arrangements would also work such as, but not limited to using a tree visitor pattern instead of recursion.

Figure 11:
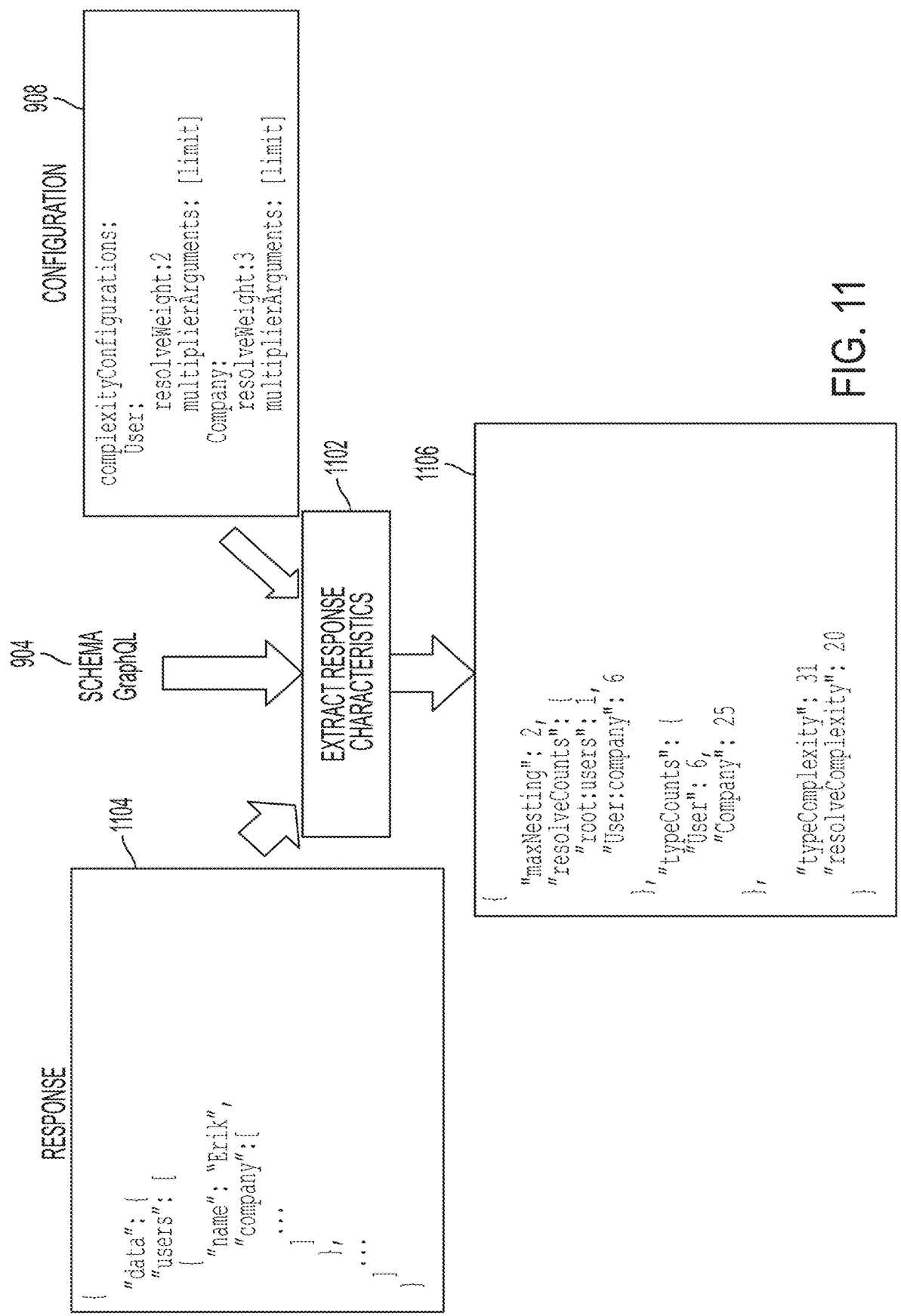
FIG. 11 depicts a block diagram of components for extracting response characteristics according to one or more embodiments of the present invention.

Turning now to FIG. 11, a block diagram of components for extracting response characteristics after the query is executed is generally shown according to one or more embodiments of the present invention. FIG. 11 is provided as one example of inputs that may used (and their values) by a response characteristic extraction process in accordance with one more exemplary embodiments of the present invention. FIG. 11 also provides one example of output, including characteristics, that may be generated by a response characteristic extraction process in accordance with one more exemplary embodiments of the present invention. Embodiments of the present invention are not limited to the components or data values shown in FIG. 11, as one skilled in the art will recognize that other types of information and data values may also be used as input to and output from a response characteristic extraction process.

The components shown in FIG. 11 include a response 1104, schema 904, configuration data 908, computer instructions to extract response characteristics 1102, and the extracted response characteristics 1106. All or a subset of the components shown in FIG. 11 may be implemented by one or more cloud computing nodes 10 and local computing devices 54A-N of FIG. 1. In accordance with one or more embodiments of the present invention, the computer instructions to extract response characteristics 1102 analyze contents of the response returned for the query. The query characteristics represent the estimated upper bound for object type counts and complexities, while characteristics of the response represent the actual object type counts and complexities of the query when it was executed. In accordance with one or more embodiments of the present invention, the computer instructions to extract response characteristics 1102 iterate the response data and in parallel iterate through the query (e.g., for type information) and update the characteristics. The updates to the rate limits are based on the actual characteristics.

Continuing with the example query described above, where the query requests ten users and for each of the ten users five companies that they have worked for, the response 1104 (only a portion of the response is shown) indicates that only six users were located and that only twenty-five companies were located across the six users. Thus, the response characteristics are calculated at the first level of nesting, as six users with one fetch with a resolve complexity rating of two and an object type complexity of six. At the second level of nesting, one fetch was performed for each of the six users each with a complexity rating of three and twenty five companies were retrieved. This object type complexity at the second level of nesting is twenty-five and the resolve complexity rating of eighteen. The cumulative results for the response characteristics are an object type complexity of thirty-one (6+25) and a resolve complexity rating of twenty (2+18). In addition, the level of nesting was two. The actual characteristics of the query as executed (as extracted from the response) are used to update counts associated with rate limits such as those shown in section 808 of the policy data 802 of FIG. 8.

Figure 12:
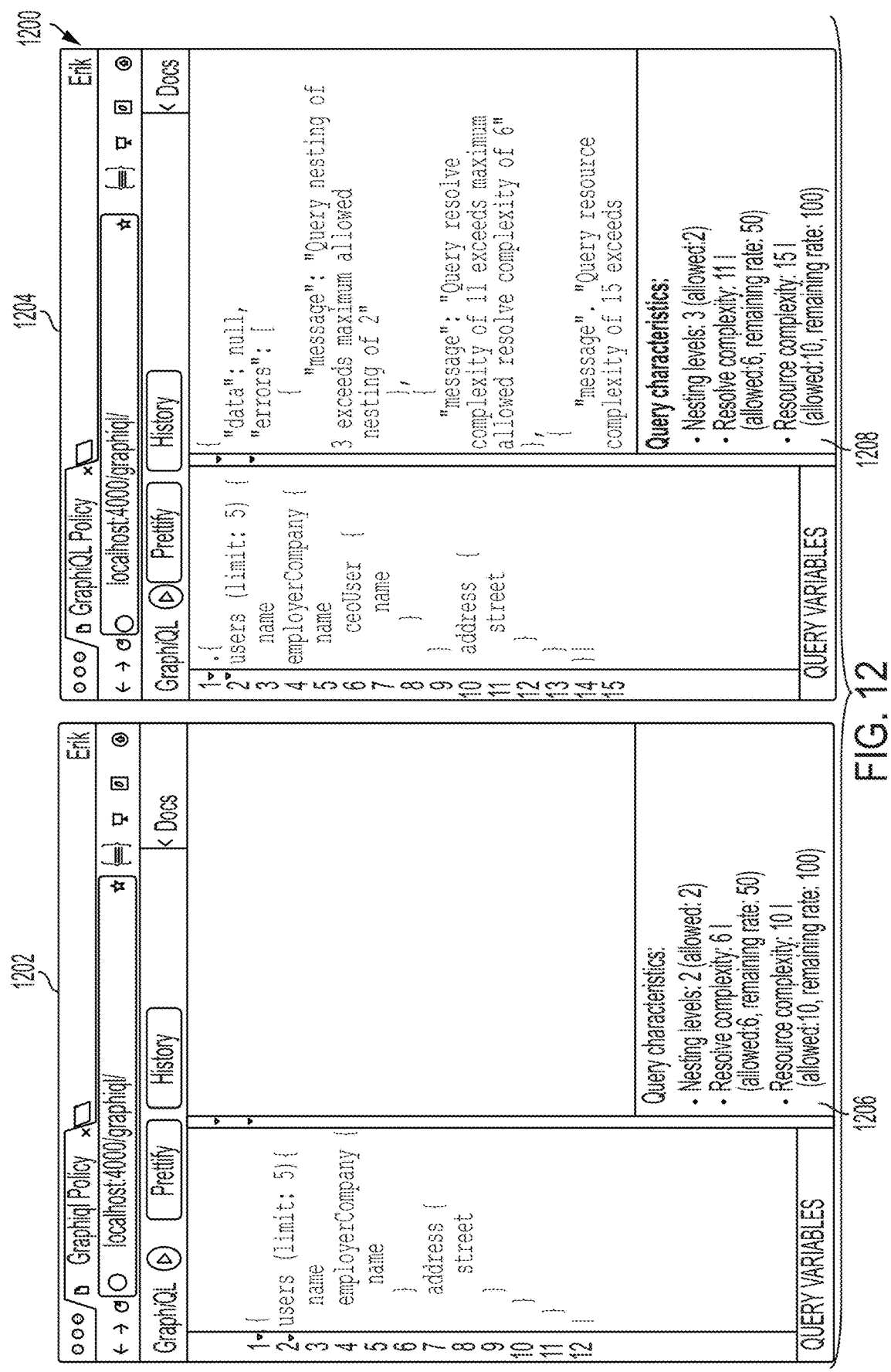
FIG. 12 depicts example user interfaces for presenting query characteristic data to a user according to one or more embodiments of the present invention.

Turning now to FIG. 12, example user interfaces 1200 for presenting query characteristic data to a user is generally shown according to one or more embodiments of the present invention. FIG. 12 is provided as an example of user interfaces that may be utilized by exemplary embodiments of the present invention. Embodiments of the present invention are not limited to the user interfaces or the content of the user interfaces shown in FIG. 12, as one skilled in the art will recognize that other formats of user interfaces and content values may also be implemented. The user interfaces 1200 may be integrated for display with other GraphQL data and functions. User interface 1202 shows a query that is being assessed to extract characteristics prior to the query being executed. The query characteristics box 1206 of user interface 1202 includes the characteristics extracted from the query (nesting level of 2, resolve complexity of 8, object type complexity of 10) as well as the query limits and over-all counts associated with each of the characteristics. In the example shown in block 1206, the query has a resolve complexity of six, six is the maximum resolve complexity allowed for a single query, and the user is allowed to use fifty more resolve complexity units in the current time frame. Based on this data it can be determined that the query shown in user interface 1202 should be permitted to execute and the query will be sent to a server, such as the GraphQL server for processing.

User interface 1204 of FIG. 12 includes query characteristics block 1208 and shows that the nesting levels, resolve complexity rating, and object type complexity of the query all exceed that query limits. Based on this data it can be determined that the query shown in user interface 1204 should be prevented from executing and the query will not be sent to the GraphQL server. Additionally, one or more error messages as shown in user interface 1204 may be presented to the user. The error messages may be emphasized on the user interface 1204 using for example, a different color or text such as red, bolded text, a graphic, and/or an audible sound.

Figure 13:
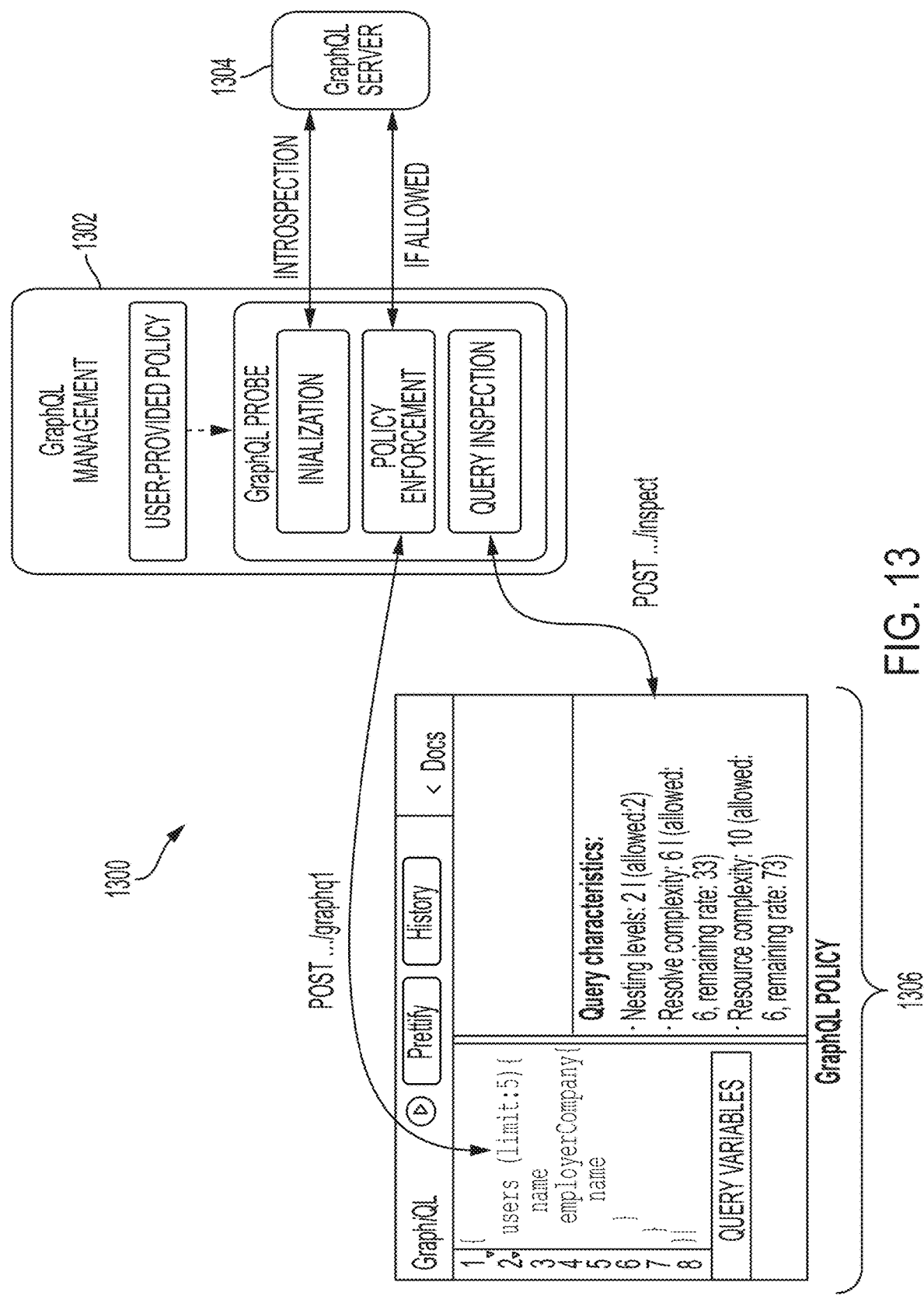
FIG. 13 depicts a system for providing a stand-alone GraphQL management layer according to one or more embodiments of the present invention.

Turning now to FIG. 13, a system 1300 for providing a stand-alone GraphQL management layer is generally shown according to one or more embodiments of the present invention. As shown in FIG. 13, a GraphQL management layer 1302 is located between a client 1306 and a GraphQL server 1304. All or a subset of the GraphQL management layer 1302, client 1306, and GraphQL server 1304 may be implemented by one or more cloud computing nodes 10 and local computing devices 54A-N of FIG. 1. In the embodiment shown in FIG. 13, the provider of the GraphQL server 1304 can configure the GraphQL management layer 1302 to block excessive or possibly malicious requests from reaching the GraphQL server 1304 in order to avoid severe system costs (e.g., high processor usage, high network usage, high data number of data accesses) and/or system outages. In addition, the provider of the GraphQL server 1304 can use the GraphQL management layer 1302 to bill clients for using the GraphQL server 1304 based, for example, on determined query complexities. Finally, by enabling access control checks in the GraphQL management layer 1302, critical resources can be protected from unwarranted access.

Figure 14:
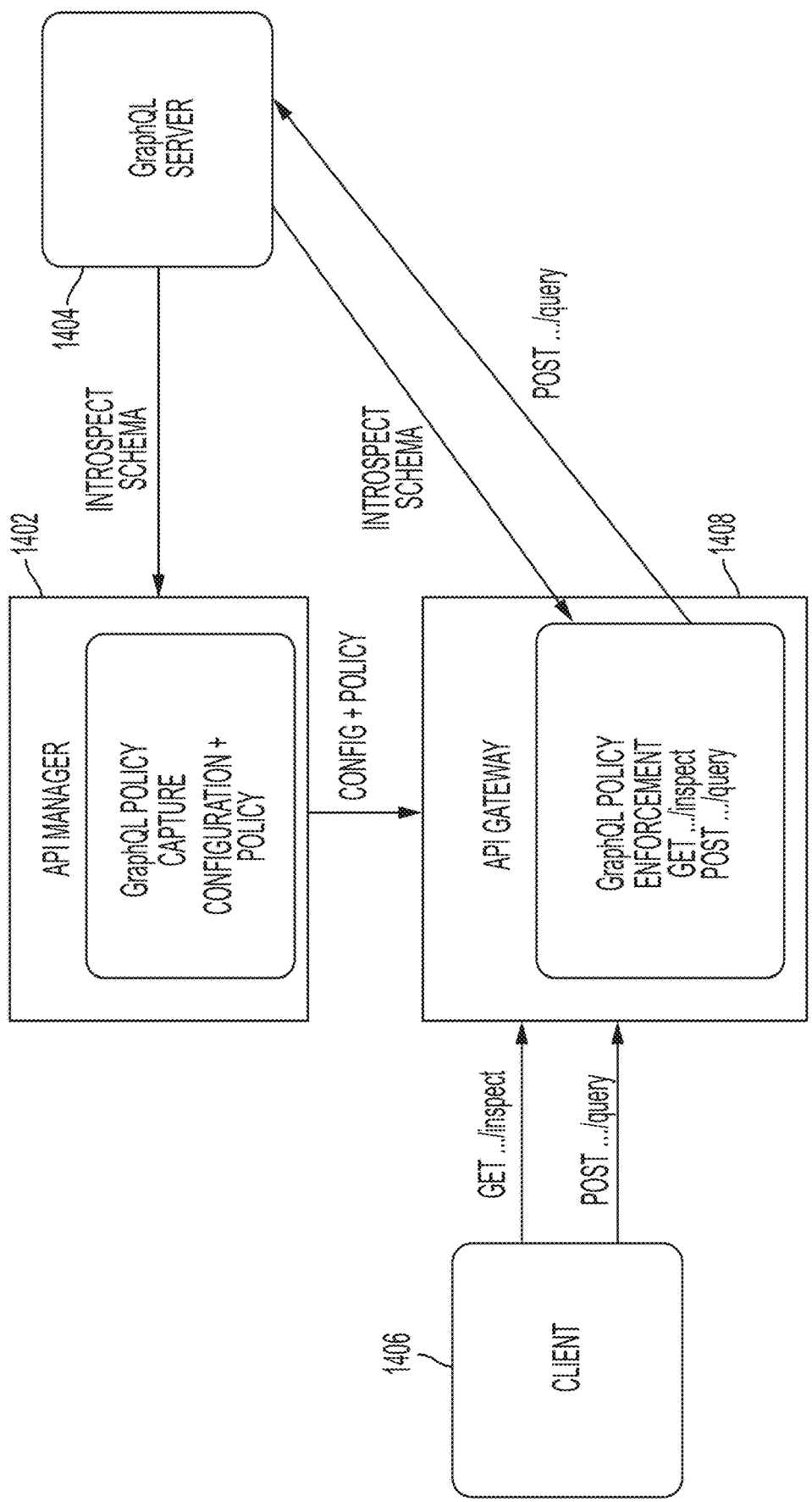
FIG. 14 a system for providing a GraphQL management layer embedded in a gateway according to one or more embodiments of the present invention.

Turning now to FIG. 14, a system 1400 for providing a GraphQL management layer embedded in an API management system is generally shown in accordance with one or more embodiments of the present invention. As shown in FIG. 14, a GraphQL management layer is integrated into an API management system, in this example the API Gateway and API Manager components of IBM® API Connect. The components shown in FIG. 14 include client 1406, API Manager 1402, API Gateway 1408, and GraphQL server 1404. All or a subset of the components shown in FIG. 14 may be implemented by one or more cloud computing nodes 10 and local computing devices 54A-N of FIG. 1.

The API Manager 1402 provides capabilities for providers to configure the management of their API and to provide policies. In combination with the embodiment shown in FIG. 14, a provider may use the API Manager 1402 to define acceptable query complexities, rate limits, and/or pricing. These configurations can be defined via graphical user interfaces. The configuration information collected by the API Manager 1402 is enforced at runtime by the API Gateway 1408. In the embodiment shown in FIG. 14, the API Gateway 1408 receives requests containing GraphQL queries from one or more clients 1406. The API Gateway 1408 statically analyzes the queries in the incoming requests as described herein and uses the resulting information, for example about query complexity or nesting, for comparison against the previously defined policies. Requests with queries fulfilling all constraints defined in the policies are forwarded to the GraphQL server 1404, while requests with queries that do not fulfill all constraints defined in the policies result in the query not being forwarded to the GraphQL server 1404 and an error response to the client 1406.

The integration of GraphQL management layer with existing API management systems such as, but not limited to, IBM API Connect, allows providers to define their policies and configurations with existing graphical user interfaces. Furthermore, the gateway components of API management systems specialize in policy checks of requests, and can perform them quickly and in high volume, thus not adding significant latency to the requests.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Many of the functional units described in this specification have been labeled as modules. Embodiments of the invention apply to a wide variety of module implementations. For example, a module can be implemented as a hardware circuit including custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like. Modules can also be implemented in software for execution by various types of processors. An identified module of executable code can, for instance, include one or more physical or logical blocks of computer instructions which can, for instance, be organized as an object, procedure, or function. Nevertheless, the executables of an identified module need not be physically located together, but can include disparate instructions stored in different locations which, when joined logically together, include the module and achieve the stated purpose for the module.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
assessing, by a management layer executing on a first processor, a query from a client application requesting data from a server, the assessing prior to the query being executed by a provider, the assessing comprising:
extracting, by the management layer, characteristics of the query, the characteristics comprising a resolve complexity of the query, the resolve complexity based at least in part on a predicted number of resolve functions that will be invoked by the provider when the query is executed, the extracting prior to initiating execution of the query;
comparing, by the management layer, the extracted query characteristics with a policy defined by the provider, the policy defined by the provider comprising individual query limits that include a maximum resolve complexity; and
based at least in part on results of the comparing, determining, by the management layer, whether the query is permitted to be executed by the provider at the server, wherein it is determined that the query is permitted to be executed based at least in part on the values of the query characteristics not exceeding the individual query limits;
initiating, by the management layer, execution of the query at the server in response to determining that the query is permitted to be executed; and
preventing, by the management layer, execution of the query at the server in response to determining that the query is not permitted to be executed.

2. The computer-implemented method of claim 1, wherein the query comprises a GraphQL query and the server comprises a GraphQL server.

3. The computer-implemented method of claim 1, wherein the assessing is static.

4. The computer-implemented method of claim 1, wherein:
the query characteristics further comprise a nesting level of the query and an object type complexity of the query; and
the individual query limits further include a maximum nesting level and a maximum object type complexity.

5. The computer-implemented method of claim 1, wherein:
the policy defined by the provider further comprises cumulative query limits that specify a maximum cumulative resolve complexity and a maximum cumulative object type complexity within a specified time period; and
it is determined that the query is permitted to be executed further based at least in part on values of the query characteristics not causing the cumulative query limits to be exceeded.

6. The computer-implemented method of claim 5 further comprising, based at least in part on the initiating, analyzing a response to the query to extract response characteristics, and updating counters associated with the cumulative query limits based at least in part on the response characteristics.

7. The computer-implemented method of claim 1 further comprising, based at least in part on the initiating, analyzing a response to the query to extract response characteristics; and updating rate limit counters of the client based at least in part on the response characteristics.

8. The computer-implemented method of claim 1, wherein the management layer comprises a stand-alone application that intercepts queries and responses flowing between the client application and the server.

9. The computer-implemented method of claim 1, wherein the management layer is integrated into a gateway application that intercepts queries and responses flowing between the client application and the server.

10. A system comprising:
a memory having computer readable instructions; and
one or more processors for executing the computer readable instructions, the computer readable instructions controlling the one or more processors to perform operations comprising:
assessing, by a management layer executing on a first processor of the one or more processors, a query from a client application requesting data from a server, the assessing prior to the query being executed by a provider, the assessing comprising:
extracting, by the management layer, characteristics of the query, the characteristics comprising a resolve complexity of the query, the resolve complexity based at least in part on a predicted number of resolve functions that will be invoked by the provider when the query is executed, the extracting prior to initiating execution of the query;
comparing, by the management layer, the extracted query characteristics with a policy defined by the provider, the policy defined by the provider comprising individual query limits that include a maximum resolve complexity; and
based at least in part on results of the comparing, determining, by the management layer, whether the query is permitted to be executed at the server by the provider, wherein it is determined that the query is permitted to be executed based at least in part on the values of the query characteristics not exceeding the individual query limits;
initiating, by the management layer, execution of the query at the server in response to determining that the query is permitted to be executed; and
preventing, by the management layer, execution of the query at the server in response to determining that the query is not permitted to be executed.

11. The system of claim 10, wherein the query comprises a GraphQL query and the server comprises a GraphQL server.

12. The system of claim 10, wherein:
the query characteristics further comprise a nesting level of the query and an object type complexity of the query; and
the query limits further include a maximum nesting level and a maximum object type complexity.

13. The system of claim 10, wherein:
the policy defined by the provider further comprises cumulative query limits that specify a maximum cumulative resolve complexity and a maximum cumulative object type complexity within a specified time period; and
it is determined that the query is permitted to be executed further based at least in part on values of the query characteristics not causing the cumulative query limits to be exceeded.

14. The system of claim 10, wherein the operations further comprise, based at least in part on the initiating, analyzing a response to the query to extract response characteristics; and updating rate limit counters of the client based at least in part on the response characteristics.

15. The system of claim 10, wherein the management layer comprises a stand-alone application that intercepts queries and responses flowing between the client application and the server.

16. The system of claim 10, wherein the management layer is integrated into a gateway application that intercepts queries and responses flowing between the client application and the server.

17. A computer program product comprising a computer readable storage medium having program instructions embodied therewith, the program instructions executable by a processor to cause the processor to perform operations comprising:
- assessing, by a management layer executing on the processor, a query from a client application requesting data from a server, the assessing prior to the query being executed by a provider, the assessing comprising:
  - extracting, by the management layer, characteristics of the query, the characteristics comprising a resolve complexity of the query, the resolve complexity based at least in part on a predicted number of resolve functions that will be invoked by the provider when the query is executed, the extracting prior to initiating execution of the query;
  - comparing, by the management layer, the extracted query characteristics with a policy defined by the provider, the policy defined by the provider comprising individual query limits that include a maximum resolve complexity; and
  - based at least in part on results of the comparing, determining, by the management layer, whether the query is permitted to be executed by the provider at the server, wherein it is determined that the query is permitted to be executed based at least in part on the values of the query characteristics not exceeding the individual query limits;
- initiating, by the management layer, execution of the query at the server in response to determining that the query is permitted to be executed; and
- preventing, by the management layer, execution of the query at the server in response to determining that the query is not permitted to be executed.

18. The computer program product of claim 17, wherein the query comprises a GraphQL query and the server comprises a GraphQL server.

19. The computer program product of claim 17, wherein the management layer comprises a stand-alone application that intercepts queries and responses flowing between the client application and the server.

20. The computer program product of claim 17, wherein the management layer is integrated into a gateway application that intercepts queries and responses flowing between the client application and the server.

* * * * *